US005635233A

United States Patent [19]
Levinson

[11] Patent Number: 5,635,233
[45] Date of Patent: Jun. 3, 1997

[54] METHODS FOR PREPARING A COFFEE, TEA AND MILK BEVERAGE

[76] Inventor: Melvin L. Levinson, 8 Stratford Cir., Edison, N.J. 08820-1830

[21] Appl. No.: 370,243

[22] Filed: Jan. 9, 1995

[51] Int. Cl.$^6$ .................. A23F 3/00; A23F 5/00; A23C 9/00
[52] U.S. Cl. .................. 426/433; 99/287; 99/297; 426/435
[58] Field of Search .................. 426/433, 435; 99/297, 287

[56] References Cited

U.S. PATENT DOCUMENTS

| | | | |
|---|---|---|---|
| 454,879 | 6/1891 | Palmieri | 99/297 |
| 607,409 | 7/1898 | Falardeau | 99/297 |
| 1,346,485 | 1/1920 | De Arrigunaga | 99/297 |
| 2,053,021 | 9/1936 | Cassol | 99/297 |
| 2,459,498 | 1/1949 | Cameron | 99/297 |
| 2,935,928 | 5/1960 | Keating et al. | 99/297 |
| 3,174,424 | 3/1965 | Serio . | |
| 3,215,060 | 11/1965 | Perlov . | |
| 3,413,908 | 12/1968 | Nadelson | 99/297 |
| 3,657,993 | 4/1972 | Close | 99/297 |
| 3,927,608 | 12/1975 | Doyel | 99/297 |
| 4,104,957 | 8/1978 | Freeman et al. . | |
| 4,233,325 | 11/1980 | Slangan et al. . | |
| 4,381,696 | 5/1983 | Koral . | |
| 4,495,392 | 1/1985 | Derby . | |
| 4,650,583 | 3/1987 | Bondanini | 99/297 |
| 4,721,835 | 1/1988 | Welker . | |
| 4,756,915 | 7/1988 | Dorby . | |
| 4,975,292 | 12/1990 | Loizzi | 426/433 |
| 5,079,023 | 1/1992 | DeSimone | 426/534 |
| 5,079,396 | 1/1992 | Katz . | |
| 5,461,968 | 10/1995 | Portman | 99/297 |
| 5,478,586 | 12/1995 | Connor | 426/433 |

FOREIGN PATENT DOCUMENTS

| | | |
|---|---|---|
| 4-53450 | 2/1992 | Japan . |
| 4-210556 | 7/1992 | Japan . |

OTHER PUBLICATIONS

"Coffee Brewing Control Chart" Coffee Brewing Institute, Inc., 120 Wall St. NYC, NY 10005.

Primary Examiner—Anthony J. Weier

[57] ABSTRACT

The plunger-strainer, of a plunger-type, coffee maker, is divided into two parts, a plunger and a strainer. The plunger and the strainer operate together and apart. The conventional, metal-spring, wire-mesh strainer is replaced with an open-pore, elastic, plastic filter. The plastic filter secures spent coffee grounds or spent tea leaves at the bottom of a beverage during consumption of the beverage. Taught are 1) "grinding" coffee-grounds, tea-leaves and/or rice grains, 2), with an electric mixer, brewing coffee and steeping tea in water or in a milk product, and 3) filtering the waste products from the mixture. Also, taught is the combination of this invention and a related application, "Apparatus and Methods for Denaturing and Whipping into a Foam Product Protein found in Milk and Egg and the Resulting Product." The related application adds heat and pH denaturing and novel foam beverages. A new coffee making apparatus and improved commercial coffee vending apparatus is described. Rice can combine with or replace coffee or milk.

26 Claims, 3 Drawing Sheets

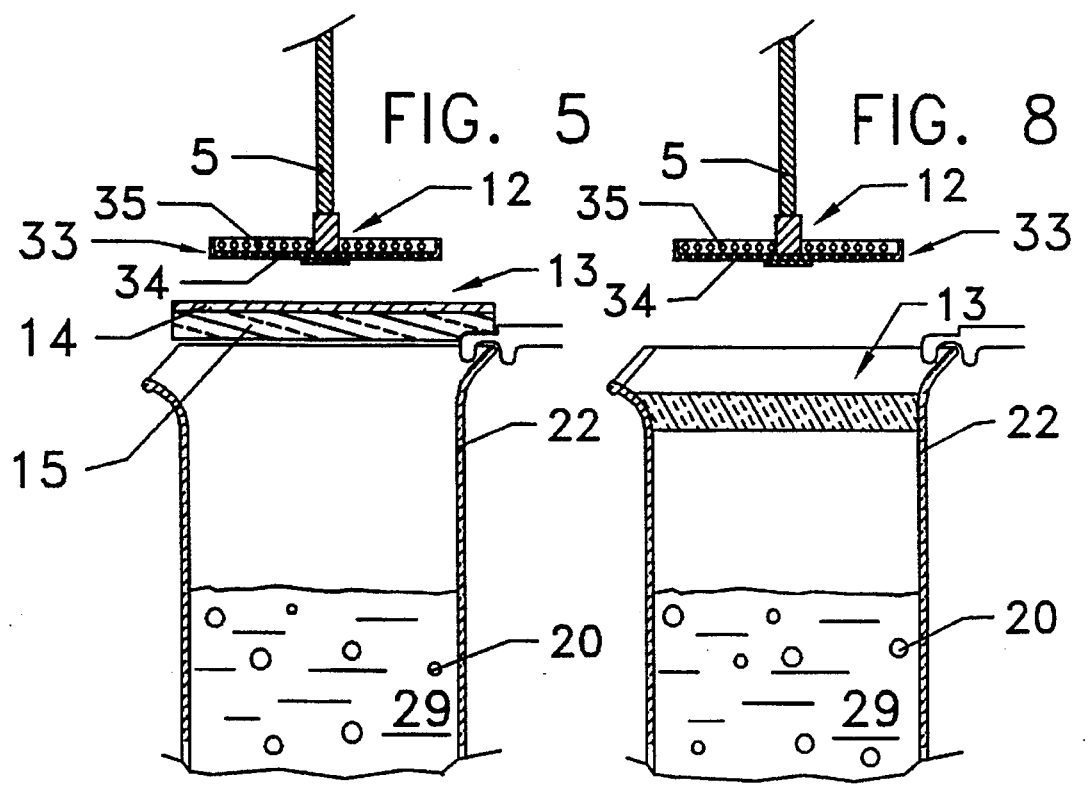

METHODS FOR PREPARING A COFFEE, TEA AND MILK BEVERAGE

BACKGROUND OF THE INVENTION

1. Field of the Invention

The present invention concerns a water, coffee, tea apparatus and a milk, coffee, tea apparatus, methods for their use, and products therefrom.

2. Discussion of the Prior Art

Numerous apparatus have been designed to prepare coffee or tea in a microwave oven. A microwave oven coffee maker consist of a microwave transparent pot or cup, designed to receive a measured quantity of water, and a brewing basket or support surface for the receipt of this measured amount of coffee. The coffee may be loose or packaged in flow-through filter bags. In a microwave oven, water is heated to its boiling point. Thereupon, the hot water is mixed with a predetermined quantity of coffee and brewed or steeped for a predetermined time.

Representative, prior art, patents for brewing coffee and tea follow: Keating, U.S. Pat. No 2,935,928; Serio, U.S. Pat. No. 3,174,424; Perlov, U.S. Pat. No. 3,215,060; Freedman, et al., U.S. Pat. No. 4,104,957; Slangan, et al, U.S. Pat. No. 4,233,325; Koral, U.S. Pat. No. 4,381,696; Derby, U.S. Pat. No. 4,495,392; Welker, U.S. Pat. No. 4,721,835; Dorby, U.S. Pat. No. 4,756,915; and Katz, U.S. Pat. No. 5,079,396. Each, of these beverage makers, employs its own unique operating sequence to prepare a particular beverage.

One plunger type coffee maker, U.S. Pat. No. 1,346,485, teaches to prepare coffee by enclosing coffee grounds between two metal disks of a piston type apparatus and to disengage this metal disc sandwich in the brewed coffee.

The prior art teaches to brew coffee by soaking coffee grounds for an extended period of time (for example, six to eight hours or overnight) in water. Prior art teaches to steep tea as follows: 1. Use cold, fresh water. Cold water contains a lot of oxygen which gives the tea its full flavor. 2. Do not overfill the strainer. Tea leaves need room to swell in order to give off their full flavor. 3. Reckon with one teaspoon (2 g.) per cup, then add one for the pot. 4. Pour water onto the tea the moment it starts to boil. Do not allow it to "over boil" since the oxygen is boiled off. 5. Let the tea stand and draw for about five minutes depending on the type tea. 6. Lift out the tea-holder and stir the tea.

STATEMENT OF THE PRESENT INVENTION

The present invention concerns an improved plunger-type coffee and tea maker. In the present invention, the plunger/strainer of the prior-art, plunger-type coffee maker is divided into, at least, two assemblies, a plunger rod assembly and a strainer assembly. The two assemblies are designed to operate together as one unit and, when not together, the strainer assembly has individual utility. Detached from the plunger, the strainer remains in the brew, containing spent grounds and leaves, thereunder, until after the brew is consumed.

It is an object of this invention to improve on the conventional, metal-spring, wire-mesh strainer, per se, of the conventional plunger-type coffee maker. In this invention, the conventional strainer assembly, consists of two independent subassemblies. A plunger plate and plastic disc filter are designed to disengage from one another. In this invention, the metal-spring, wire-mesh filter, of a conventional, plunger-type coffee maker, is replaced with an independent, open-pore, elastic, plastic disc filter. A plate on the plunger abuts and operates this plastic disc filter.

It is an object of this invention to brew coffee grounds and steep tea leaves while they are immersed and dispersed in water so the individual grounds and leaves are not exposed, dry and in a clump, to microwave energy. Dry and in a clump, coffee ground, exposed to microwave energy, heat to temperatures that would release an undesired bitter taste and prematurely vaporize volatile aromas.

This invention concerns the design and operation of a beverage maker. Mechanical agitation, temperature and time combinations result in the brewing of a reliable and reproducible beverage of desirable, strength, aroma and flavor. In a preferred embodiment, the mixture, of hot water and coffee grounds or tea leaves, is agitated with a high speed electric beater.

In place of the old art practice of brewing coffee or steeping tea in, circa 200° F. water that is later dispensed in cool cups, in this invention, coffee may be "brewed" and tea "steeped" in circa 140°–200° F. water and in the same cup in which it will be consumed. This invention teaches to utilize the heat, stored during brewing, in the spent coffee grounds and in the brewing apparatus, to keep coffee hot, during a serving interval It is a further object of this invention to improve the preparation of coffee or tea by beating, with an electric mixer, a circa, 70°–170° F. mixture of coffee-grounds or tea-leaves and water. Thereafter, filtering out and containing, in the beating vessel, the spent waste coffee-grounds or tea-leaves. The coffee grounds and tea leaves are beaten 1) to release caffeine, flavor and aroma from the coffee grounds, 2) to emulsify the aroma carrying oil in the brew, and 3) to speed "brewing" of the beverage. Beating adds oxygen which gives the tea its full flavor.

It is an object of this invention to provide apparatus that permits each member of a group to prepare a cup of coffee or tea to suit his or her individual preference. In a restaurant setting, the apparatus and methods taught affords each patron the opportunity to order a cup of coffee, prepared, in the cup in which it is served, to suit each patron's individual preference as to temperature, quantity, strength, flavor and aroma. Each individual may prepare his or her beverage with the quantity and type of additives (for example, flavoring and lemon slices) desired.

It is an object of this invention to provide apparatus to simplify the handling and disposal of waste by-products, as spent coffee grounds, tea leaves, rinds and seeds.

It is an object of this invention to process coffee or tea either loose or in paper "tea" bags and, after the brewing of the coffee or tea, to provide for the temporary storage and easy disposal of the spent coffee or tea.

It is an object of this invention to make a beverage maker that is simple in construction, produced from relatively inexpensive material, and is reusable.

It is a further object of this invention to provide apparatus to facilitate the preparations of the "whipped-coffee-milk," "whipped-coffee-cream," "whipped-tea-milk," and "whipped-tea-cream" described in my copending application.

It is an object of this invention to describe the combination of a plunger/filter beverage apparatus with a conventional blender and an electric coffee grinder.

It is an object of the invention, to incorporate a beating apparatus into a commercial, coffee vending machine. Preferably, this vending machine will afford each customer the opportunity to select a cup of coffee that can be "beaten" (e.g. "brewed" swiftly) to suit his or her individual preference as to strength, flavor and aroma. Preferably, by providing the vending machine with a customer operated switch that controls the time of heating, each customer may choose a cup of coffee to suit his or her preference

DESCRIPTION OF THE DRAWINGS

The advantages and benefits resulting from the described microwave oven coffee-tea-beverage apparatus will become apparent from the following detailed description and by reference to the accompanying drawings in which:

FIGS. 5–8 illustrates a side-view cross-section of the operation, of the two-part, plunger/strainer assembly of the invention.

DESCRIPTION OF THE PREFERRED EMBODIMENTS

Figure 1:
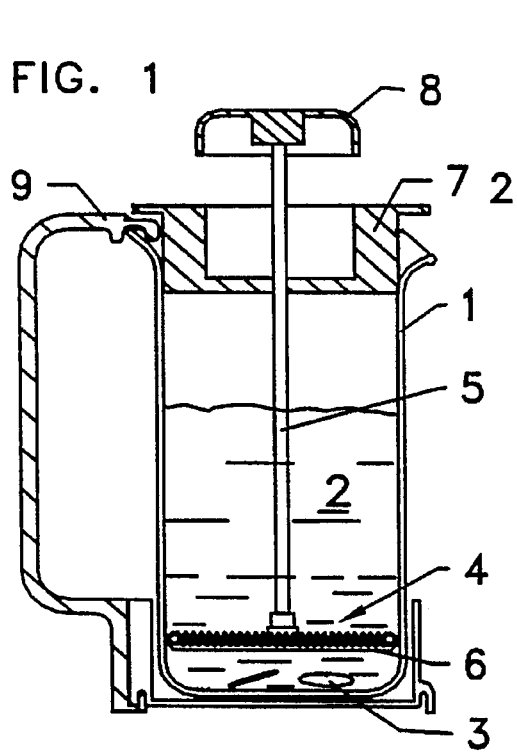
FIG. 1 illustrates a side-view cross-section, of a prior art, microwave-oven, plunger, coffee-tea-beverage apparatus.

Presently, there are "microwave oven" plunger type coffee makers, as illustrated in FIG. 1, in the marketplace, that teach, before you insert filter-plunger apparatus 4, water 2 may be boiled, in a microwave oven, in glass cylinder container 1. Those that sell these prior-art, plunger coffee makers teach:

Water 2 is, first, boiled in glass cylinder container 1 with a handle grip 9. Thereafter, a predetermined amount of coffee grounds 3 are added to the boiled water 2 and allowed to brew for a predetermined time, for example, four minutes. Whereupon, the filter-plunger apparatus 4, a metal rod 5 with a permanent stainless steel mesh filter 6 on one end and a lid 7 and a plunger handle 8 on the other end, is inserted into cylinder container 1 and pressed down. In the prior art, the plunger rod 5 is not long enough to force the steel mesh filter 4 into contact with the bottom of glass cylinder container 1. Prior art does not teach to serve the beverage with tea leaves, citrus rinds, or coffee grounds 3 compressed between filter 4 and the bottom of glass cylinder container 1. In the prior art, the prepared beverage is poured out into serving vessels.

Most seek the "Ideal" cup of coffee as defined by the "Coffee Brewing Control Chart" available from the Coffee Brewing Institute, Inc. 120, Wall Street, New York, N.Y. 10005. Coffee is described as ideal, weak, strong, underdeveloped, or bitter. In the apparatus of this invention, it is possible to prepare "ideal" coffee using the circa 200° F. temperatures and the long steeping or brewing times recommended in the prior art. But, surprisingly, the apparatus, of this invention, brews or steeps "ideal" coffee or tea, in a microwave oven, at brewing temperatures and brewing times not considered practical in the prior art. Surprisingly, the apparatus and methods, of this invention, prepares a beverage, with a rich taste and full body, at temperatures substantially below those recommended in the prior art.

Figure 2:
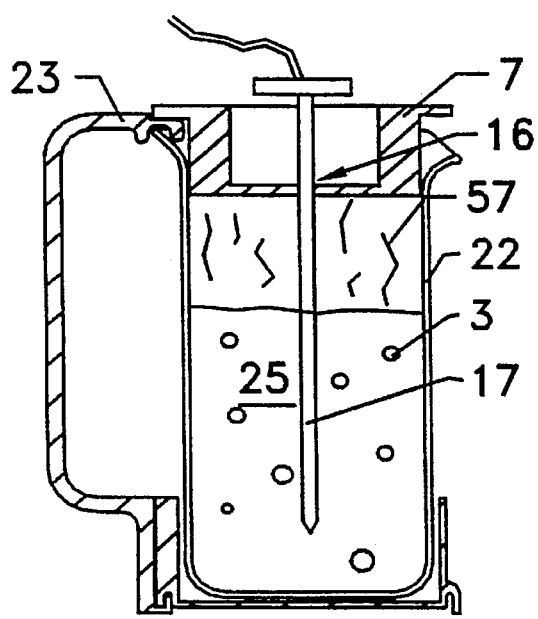
FIG. 2 is a composite view of either a coffee brewing or a protein product denaturing.

FIG. 2 illustrates an improved plunger type coffee or tea maker. Cup 22 is made of a durable, microwave-transparent, heat-resistant material, such as ceramic, plastic or Pyrex. It is provided with a cup handle 23 and a thermometer 17.

Preferably, in cup lid 7, a thermometer guide hole 16 is provided for thermometer 17. Preferably, thermometer 17 is a microwave oven probe thermometer, that switches off the microwave oven at a predetermined temperature. First time users may employ thermometer 17 to determine, empirically, the time required for a given mixture of water and coffee to reach a predetermined temperature.

In FIG. 2, brewed coffee 25 may be, if desired, allowed to mature. Maturing the beverage means that the grounds are allowed to soak, for a predetermined time, in hot water after heating. Then, as illustrated in FIGS. 5–7, the coffee grounds or tea leaves 20 are compressed, under two-part, plunger/filter assembly 11. Plunger/filter assembly 11 consists of plunger 12 and filter 13. When plunger 12 is removed, the beverage is ready for drinking. Since filter 13 is left fixed at the bottom of cup 22, one must first drink the prepared coffee to behold filter 13

It is well known that exposing citrus fruit to microwave energy simplifies the extracting of juice therefrom. Hence, it is preferred to cut citrus fruit (e.g. lemon) into small wedge shapes and mix the cut wedges with the tea leaves beneath the filter. Filter 13 secures and compresses the spent tea leaves 20, citrus fruit pieces 18, citrus fruit seeds 19 and the like between it and the inside, bottom wall 24 of cup 22. While the spent byproducts remain confined between filter 13 and bottom wall 24, the tea is consumed. The old art requirement, 1) to individually seek out and remove, by hand, prior consuming the tea, fruit seeds, spent lemon wedges and spent tea bags and 2) the need to locate a place to store these spent items until they are disposed of, is obviated.

The measured amounts of coffee or tea, employed, in this invention, may consist of loose particles, per se, or particles enclosed in conventional, flow-through packages as "tea" bags. Advantageously, this invention mechanically alternately agitates and compresses the tea or coffee inside the "tea" bag. It is believed that the filter paper, per se, of a "tea" bag, impedes the steeping of the coffee grounds or tea leaves contained therein. It should be appreciated that, when the plunger and filter of this invention, repeatedly, compresses and then releases pressure on a paper tea bag, this action aides in the steeping of the tea or coffee, This action, mechanically forces liquid in and out of the tea leaves. The results obtained are superior to the old art method of wrapping a dip string around a wet tea bag or squeezing the tea bag beneath a spoon or the like. Some might consider it beneficial if the plunger and filter ruptures the tea bag. If the paper covering the tea bag ruptures, by plan or accident, the tea leaves steep unimpeded by the blocking action of the paper that contains the tea leaves.

In the prior art, FIG. 1, beverage maker, the metal filter assembly 4, when fully inserted, is prevented from reaching the bottom of fragile glass container 22. In the embodiment, of FIGS. 5–7, the foam filter 13, spent coffee grounds and tea leaves 20 buffer the metal plunger 5 from direct contact with the fragile bottom of glass container 22.

The conventional metal-spring and metal-mesh filter assembly 4, besides being difficult to clean, has certain disadvantages. The small fixed holes of the metal-mesh filter easily block up, which impedes the operation of the filter assembly 4, and results in spent coffee grounds and tea leaves being forced around it. Metal-mesh filter assembly 4 is difficult to clean.

To obviate the aforementioned problems associated with the use of metal filter assembly 4. As illustrated in FIGS. 5–8 the metal spring and wire filter of plunger assembly 4, of FIG. 1, have been removed and plunger assembly 4 has been replaced with a new two-part assembly 11. Two part assembly 11 consists of plunger 12 (i.e. rod 5 attached to, metal, plunger plate 33) and filter 13. Metal, plunger plate 33 has perforations 34 on its flat surface as well as the perforations 35 which previously held the metal spring to plunger plate 33,. Plastic foam 13 may be a suitable, open-pore, plastic foam, for example, polyurethane foam or a strong, nylon mesh. As illustrated, in FIGS. 5 and 8, plastic foam 13 is compressible and physically independent of plunger 12.

In operation, in FIG. 5, a flat disc (circa ⅛ to ⅝ inches thick), of open pore plastic foam filter 13, that is slightly larger in diameter than the diameter of the open top of cup 22, is placed, as illustrated. After plastic foam filter 13 is placed on cup 22, plunger 12, from above and in contact with plastic foam 13, is manually urged into cup 22. In operation, plunger 12 forces the plastic foam filter 13 to the bottom of cup 22 where it remains and, then, plunger 12 is removed. After the beverage 25 is consumed, the wet, flexible plastic foam filter 13 and the spent coffee grounds or tea leaves 20 are easily removed from cup 22.

The shape of the plunger 12 and the flat filter of plastic foam filter 13 is selected to complement the shape of open top of cup 22. Small tabs may be employed to project from the circumference of the foam disk 13 to aide in centering and maintaining plastic foam filter disk 13 horizontal during the initial forced insertion into cup 22.

Preferably, plastic filter 13 may be a two layer laminate. For example a strong, ⅛ inch thick, flexible, nylon fiber mesh 14 may be laminated onto a ¼ inch thick, soft, open pore polyurethane foam 15.

Not shown, optionally, an independent, thin, paper coffee filter may be combined with plastic foam filter 13. In operation, a flat, disposable, paper filter, that is larger in diameter than foam filter is placed beneath filter and combines in function and result with foam filter.

In operation, plunger 12 may be operated with an additional up and down motion in contact with plastic foam 13. This gently up and down motion forces liquid in and out of plastic foam 13 which prevents a build up of coffee ground or tea leaves on the bottom surface of foam 13 during its descent to the bottom of cup 22. When foam 13 reaches the bottom of cup 22, this gentle up and down motion, forces liquid in and out of foam 13. This movement of liquid, in contact with the coffee grounds or tea leaves 20, enhances brewing and steeping.

Note, in FIG. 7, because plunger plate 33 is smaller in diameter than the diameter of the circa ⅜ inch thick, foam disc 13, in operation, the sides, of foam disc 14,15, are bent to form upward curve 37. Advantageously, during the downward passage of plunger 12, the foam material, in this upward curve 37, is compressed and so exerts force against the side walls of cup 22. This upward curve 37 blocks the escape of spent coffee grounds 20 around the sides of foam 13 into the filtered brewed coffee 25. When plunger 12 is removed, the compressed, elastic material, in this upward curve 37, trying to expand (e.g., flatten out) against the rigid walls of cup 22, holds foam disc 13 in place.

Copending Application, "Apparatus and Methods for Denaturing and whipping into a Foam Product Protein found in Milk and Egg and the Resulting Product,"

The related Copending Application concerns, apparatus and methods that one may use to denature protein in a liquid, dairy product to produce a "Pro-Whip syrup" that is subsequently, whipped into a new food product, termed "Pro-Whip". Herein, the one part plunger assembly, taught in the copending application, is divided into two parts a removable plunger member and an independent strainer member.

To prepare Pro-Whip, a starting milk product is heated, in a container, until it foams and seems likely to boil out of the container. If desired, the heat source may be reduced and the milk product permitted to simmer for a predetermined time. Thereafter, the resulting denatured milk product, a "Pro-Whip syrup," is whipped to a desired consistency.

The copending Application teaches that coffee grounds or tea leaves may be mixed with skim milk, evaporated milk, whole milk, and half and half milk, light cream or heavy cream and heat denatured. Then, a plunger/filter is inserted into the heat processing cup and it is slowly forced to the bottom of the cup. This operation filters the spent coffee grounds or tea leaves out of the resulting coffee or tea denatured milk. Thereafter, this "Pro-Whip Syrup" is whipped into an expanded foam product called "Pro-whip."

Alternately, the starting milk product and coffee mixture is denatured by lowering its pH to below a pH of 5. Concurrently, it is whipped into a Pro-Whip.

Figure 4:
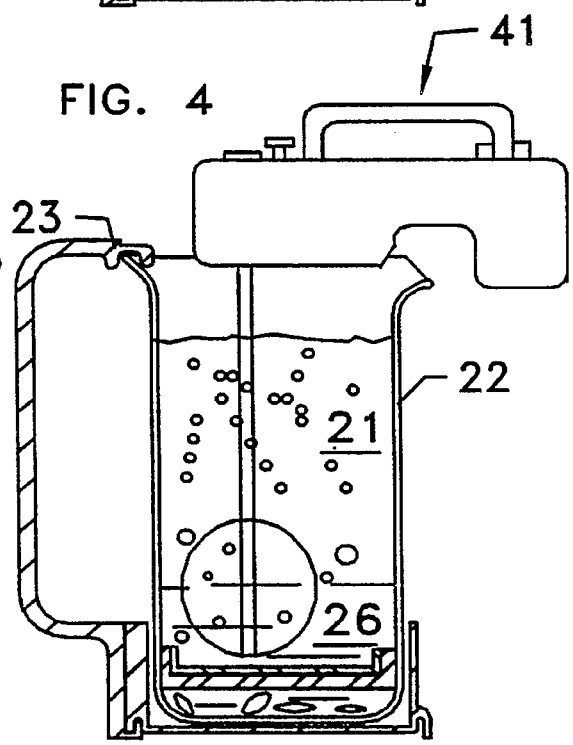
FIG. 4 illustrates the "milk-coffee" Pro-Whip, of my copending application, being whipped into a foam.

In the copending application, the filtered, heat-denatured milk mixture must be transferred from a denaturing container to a whipping container. Herein, in the same cup in which it was brewed and denatured, the brewed, heat-denatured, coffee-milk mixture 26 may be whipped into a Pro-Whip 21, in cup 22,. As illustrated in FIG. 4, in this invention, the spent, hot tea leaves or coffee grounds 20 are trapped beneath a porous, plastic filter 13 during the whipping, the serving and consumption of the resulting Pro-Whip 21. Note, by shortening the heating and/or whipping time, one can increase the amount of liquid beneath a layer of foam. Conversely, by extending the heating and/or whipping time, one can decrease the amount of liquid beneath a layer of foam.

Espresso coffee is in contemplation. Surprisingly, by following the teachings of this invention and increasing the amount of coffee grounds and beating time, a filtered brew may be prepared that appears (e.g. it may have a brown "coat" floating on the brew) and tastes like a brew prepared from "espresso" coffee grounds in an espresso coffee maker. If brewed with the combined teachings of the copending application and the teachings of this application, the result is a novel milk or cream, espresso Pro-whip The invention obviates the heat wasted when heated water is poured through cool air into a coffee filled filter. The invention obviates the heat waste associated with pouring a hot brew into a cold serving cup.

Figure 9:
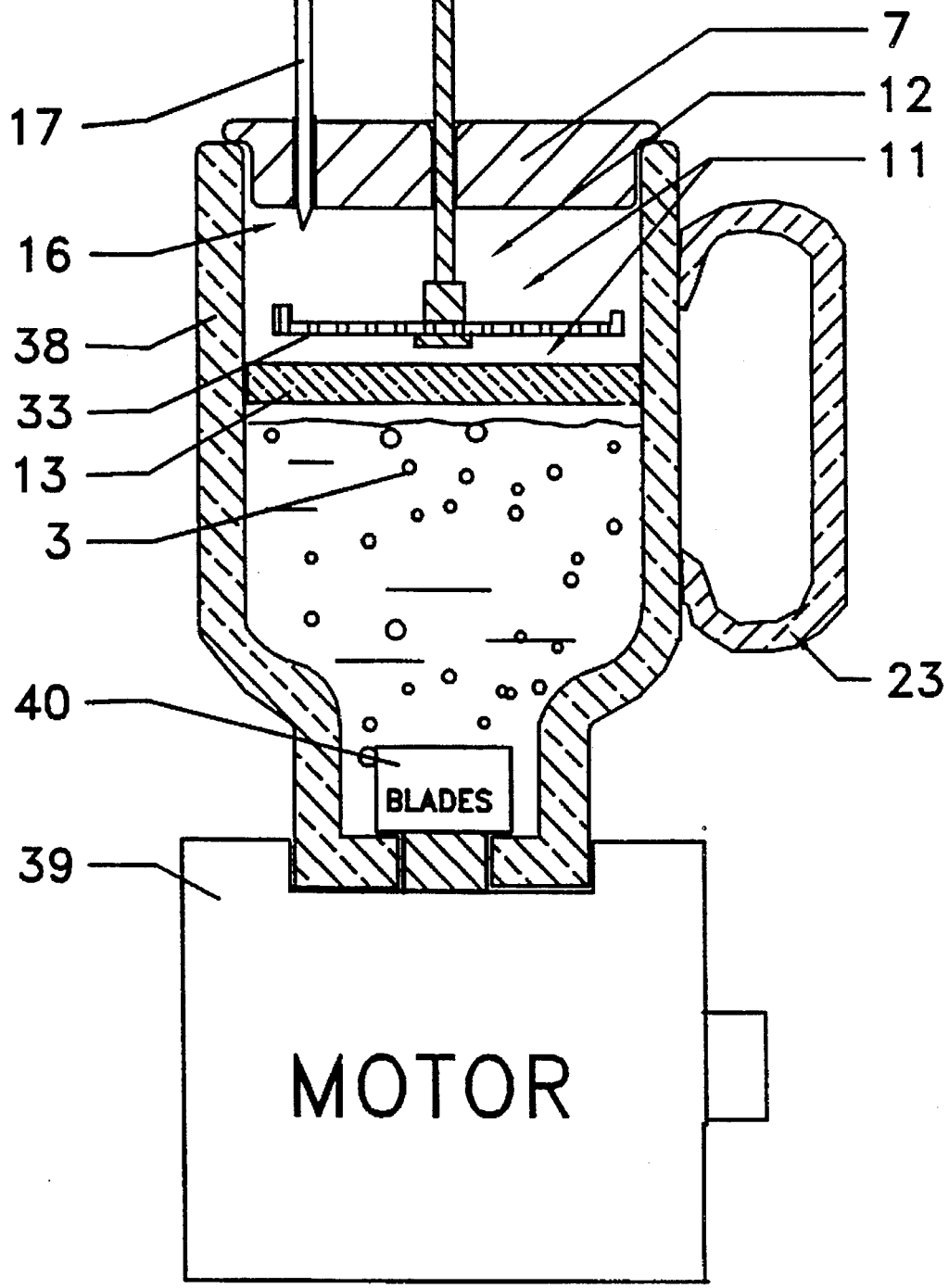
FIG. 9 is a composite view in cross section of an apparatus that combines a conventional blender design with the embodiments illustrated in FIGS. 2–8.

FIG. 9 illustrates an apparatus that combines a blender designed to "grind" coffee beans, with a blender designed to whip milk, and with the apparatus illustrated in FIGS. 2-8. In operation, a predetermined amount of coffee beans are placed into blender cup 38 and conventionally "ground" (e.g. chopped) into small pieces. Then, a predetermined amount, of water or a milk product, is added.

Either before or after an initial beating, cup 38 and cold contents are removed from motor base 39 and heated to a predetermined temperature in a microwave oven. If desired, microwave temperature probe 17 may be employed. Whereupon, heated cup 38 and contents are returned to motor base 39 and further beaten. Then, as described, supra, two part plunger filter 11 is deployed. In the case of a coffee-milk product Pro-Whip, filter 13 is deployed before whipping the heated mixture into a coffee-milk Pro-Whip. In the case of a coffee brew, filter 11 is deployed after a final beating and before serving the resulting beverage.

Surprisingly, in FIG. 9 if one pulverizes coffee grounds or tea leaves and, thereafter, prepares coffee or tea from the resulting "powder", the result is a rich, tasty beverage. The beating, of a hot, pulverized coffee grounds or tea leaves and liquid mixture, results in a beverage that is fully "brewed" or "steeped" in a fraction of the preparation time taught in the prior art. When a, circa, eighty-gauge, open-pore, polyurethane filter is used only a minor amount of "sediment" remains in the finished beverage.

GENERAL COMMENTS

Preferably, before beating the water and tea leaves or coffee grounds, the mixture is heated to a temperature hotter than a desired serving temperature (for example, 120° F.). Then, the beverage is beaten to enhance the brewing process. The beating time may be chosen to cool the brew to a desired serving temperature Coffee or tea, heated, to circa 130–180° F. and then beaten, provides a full bodied beverage that does not require a long cooling time before it can conveniently be consumed. Preferably, the coffee and tea are brewed, steeped and beaten at lower water temperatures than recommended in the prior art. At higher temperatures bitter taste may develop and flavor and aroma may be lost.

Figure 3:
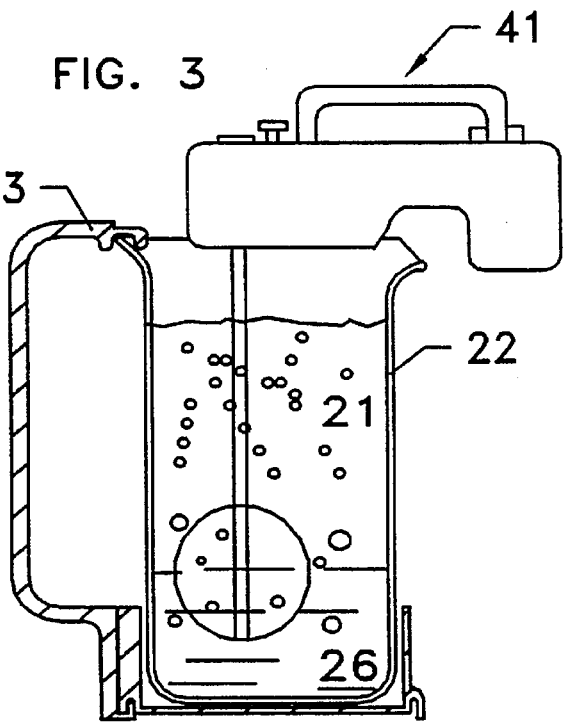
FIG. 3 is a composite view that illustrates either coffee grounds and hot water beaten with and electric mixer or the heat denatured protein, of my copending application, being whipped into a Pro-Whip.

In FIGS. 3–4, cup 22 is large enough to accommodate the beater blades of high speed mixture 21. For use on a conventional gas or electric burner, cup 22 is constructed of metal or glass ceramic. For use in a microwave oven, cup 22 is constructed of microwave-permeable material as plastic, ceramic, glass or paper. When exposed to microwave energy, the individual coffee grounds or tea leaves are not, confined in a dry pile that, exposed to microwave energy, will heat to an excessively high temperature, but they are dispersed in and surrounded by water.

Advantageously, the heat stored, in the spent coffee grounds, trapped beneath the strainer, during the preparation of the beverage, aides in keeping the beverage hot during a serving period. In the prior art, inconveniently, a separate receptacle must be provided for hot, spent coffee/tea bags, citrus finds, seeds and the like and their stored heat is no longer available to maintain the serving temperature.

A well known way, of preparing coffee, is to soak coffee grounds in room temperature water over night, filter the resulting beverage, and, thereafter, consume it hot or cold. Surprisingly, the apparatus and methods, of this invention, may be employed to improve on this method. In cup 22, place a predetermined mixture of room temperature water and coffee grounds or tea leaves. After a few minutes, with an electric mixer, beat the mixture until a desired coffee is "brewed" or a desired tea is "steeped. Thereafter, insert the two part plunger 11 into cup 22, as taught herein, then remove plunger 12 and partake of the beverage.

Preferably, after each use, cup 22 or cup 38 is emptied of the soiled filter and the waste by-products. Clean wash water is added. The filter is rinsed and reinserted into cup 22 or cup 38. The plunger is pumped, in and out of flexible, plastic filter, compressing and releasing the wash water. This action flushes out small coffee grounds or tea leaves trapped in the plastic filter.

If, after cleaning, spent coffee grounds or spent tea leaves and sediment remain, undesirably, in the plastic filter, the plastic filter, per se, may be washed in a dishwasher or washing machine or simply replaced. Preferably, place plastic filter, in a sink, beneath running water, and brush it clean with a kitchen dish brush It is expected that some will employ the teachings, herein taught, to improve commercial, coffee-vending apparatus. In this improved vending machine, at a predetermined temperature, a mixture of coffee grounds and water is vigorously beaten prior to the filtering out of the coffee grounds and the vending of the beverage. In addition, by providing a customer operated control that selects the time the mixture is beaten, each customer, using the apparatus, will be able to adjust the strength, flavor and aroma, of the brewed coffee, to suit his or her individual taste.

It should be understood that beverages, other than coffee or tea, may be made. For example, rice grains may be "ground" (e.g. pulverized) in blender cup 38 and, in the same manner described to prepare coffee, a "rice beverage" or a "rice-milk" beverage may be prepared. Alternately, coffee beans and rice grains may be pulverized together and a "coffee-rice-beverage" or a "coffee-rice-milk" may be prepared. Some, allergic to milk, per se, may prefer a "coffee-rice-beverage" prepared without milk.

Although this invention has been described with a certain degree of particularity, it is understood that the present disclosure has been made by way of example and that numerous changes in details of construction and arrangement of parts may be resorted to without departing from the spirit and scope of the invention. It should be understood that the shape, of the container and matching plunger and filter, need not be circular, but may be, for example, square. When using compressible plastic disk filters the walls of the beverage container may be a truncated cone shape.

I claim:

1. A method for preparing coffee or tea, that includes the steps of:

placing a predetermined amount of water and coffee grounds or tea leaves into a beverage container, after a predetermined time, inserting a plunger device, into said beverage container, where said plunger device comprises a plunger means and a contiguous filter means and where said plunger means freely releases from said filter means, operating said plunger device so that said plunger means forces said filter means to the bottom of said beverage container, releasing said plunger means from said filter means, and removing said plunger means from said container and leaving said filter means in said container trapping, between its lower surface and the bottom, of said beverage container, filtered out spent coffee grounds or tea leaves from the resulting beverage.

2. A method for preparing coffee or tea, according to claim 1, that includes the step of:

before inserting said plunger device into said container, beating said mixture, of water and coffee grounds or tea leaves, with an electric mixer for a predetermined time.

3. A method for preparing coffee or tea, according to claim 1, that includes the step of:

before inserting said plunger device into said container, heating said mixture, of water and coffee grounds or tea leaves, to a pre-determined temperature.

4. A method for preparing coffee or tea, according to claim 1, that includes the step of:

before inserting said plunger device into said container, heating said mixture to a predetermined temperature and then, mechanically, beating said mixture, of water and coffee grounds or tea leaves, for a predetermined time.

5. A method for preparing coffee or tea that includes the steps of:

placing a predetermined amount of liquid and coffee grounds or tea leaves into a beverage container, heating said mixture of liquid and coffee grounds or tea leaves, inserting a plunger apparatus, where said plunger apparatus comprises a plunger device with a contiguous filter means engaged on its base and where said plunger device, freely releases from said filter means, into said heated container, operating said plunger apparatus so that said plunger device forces said filter means to the bottom of said beverage container, releasing said plunger device from said filter means, and removing said plunger device, from the resulting beverage while said filter means remains in place, in said container, and said filter means traps, between itself and an inside wall, of said container, spent coffee grounds or tea leaves filtered-out of the resulting beverage.

6. A method for preparing coffee or tea, according to claim 5, that includes the steps of:

measuring the temperature of said mixture during said heating, and heating said mixture to a predetermined temperature.

7. A method for preparing coffee or tea, according to claim 5, that includes the steps of:

where said liquid is a milk product.

8. A method for preparing coffee or tea, according to claim 5, that includes the steps of:

initially adding citrus fruit pieces to said mixture, and subsequently trapping said citrus fruit pieces between said filter and an inside wall of said beverage container.

9. A method for preparing coffee or tea, according to claim 5, that includes the steps of:

before operating said plunger apparatus, waiting a predetermined time for the coffee or tea to mature.

10. A method for preparing coffee or tea, according to claim 5, that includes:

where the coffee grounds or tea leaves are in a compressible, flow-through package.

11. A method for preparing coffee or tea, according to claim 7, that includes the steps of:

heating said mixture, in a microwave oven, to, at least 190° F.

12. A method for preparing coffee or tea, according to claim 5, that includes the steps of:

where said mixture is heated to a temperature below 170° F.

13. A method for preparing coffee-milk or a tea-milk beverage, that includes the steps of:

adding a predetermined amount of a milk product and coffee grounds or tea leaves into a container, after a predetermined time, inserting a plunger device, into said beverage container, where said plunger device includes a plunger means and a filter means, operating said plunger device so that said plunger means forces said filter means to the bottom of said beverage container, disengaging said plunger means from said filter means, removing said plunger means from said beverage container, and leaving said filter means, in said container to trap, between a surface of said filter means and a wall, of said container, spent coffee grounds or tea leaves that said filter means filtered-out of the resulting beverage.

14. A method for preparing coffee-milk or a tea-milk beverage, according to claim 13, that includes:

where said milk product is selected from the group consisting of liquid powdered milk, evaporated milk, whole milk, half and half milk, and cream.

15. A method for preparing coffee-milk or a tea-milk beverage, according to claim 13, that includes:

heating said milk product and coffee grounds or tea leaves to the denaturing temperature of said milk product, and, thereafter, beating said mixture with an electric beater.

16. A method for preparing coffee-milk or a tea-milk beverage, according to claim 13, that includes:

lowering the pH of said beverage to below a pH of 5, lastly, whipping said resulting beverage until, at least, a portion of said beverage is whipped into a foam topping where the volume of said foam topping is, at least, two times the volume of said liquid foodstuff.

17. A method for preparing coffee-milk or a tea-milk beverage, according to claim 13, that includes:

heating said mixture to at least, 190° F. for a predetermined time, and then, after removing said plunger means from said container, whipping said resulting beverage until, at least, a portion of said beverage is whipped into a foam topping where the volume of said foam topping is, at least, two times the volume of said liquid foodstuff.

18. A method for preparing coffee or tea, according to claim 4, that includes the step of:

where said beverage container is a chamber, in a coffee vending machine apparatus, that receives a mixture of coffee and water before it is filtered.

19. A method for preparing coffee or tea, according to claim 18, that includes:

apparatus to control the time of the beating of said mixture.

20. A method for preparing coffee or tea, according to claim 18, that includes:

where said water is milk or cream.

21. A method for preparing coffee or tea, according to claim 4, that includes:

where said beverage container is a chamber, in a coffee-grinder-blender apparatus, that receives the mixture of water and coffee grounds or tea leaves before it is filtered, placing a predetermined amount of coffee beans or tea leaves into said apparatus, and then, in said apparatus, and grinding said coffee beans or tea leaves to a predetermined particle size, thereafter, adding said predetermined amount of a liquid into said container.

22. A method for preparing coffee or tea, according to claim 4, that includes the steps of:

where said beverage container is a chamber, in a coffee-grinder-blender apparatus, that receives the mixture of water and coffee grounds or tea leaves before it is filtered, where said mixture is heated by removing said container containing said mixture from said blender apparatus, and heating said removed container containing said mixture in a microwave oven for said predetermined time before returning said container containing said mixture to said blender apparatus.

23. A method for preparing coffee or tea, according to claim 21, that includes:

where said liquid is a milk product.

24. A method for preparing coffee or tea, according to claim 21, that includes:

placing a predetermined amount of rice grains along with said coffee beans or tea leaves into said apparatus, and grinding said rice grains along with said coffee beans or tea leaves to said predetermined particle size.

25. A method for preparing coffee or tea, according to claim 21, that includes:

placing a predetermined amount of rice grains into said apparatus and grinding them along with said coffee beans or tea leaves.

26. A method for preparing coffee or tea, that includes the steps of:

placing a predetermined amount of water and coffee grounds or tea leaves into a beverage container, after a predetermined time, inserting a plunger device, into said beverage container, where said plunger device comprises a plunger means and a filter means, where said filter means is compressible, where said filter means is designed, in its compressed state, to elastically abut the inner walls of said container, where, when detached, from said plunger device in said container, said compressed, elastic, filter means is designed to maintain its position, in said container, until physically removed from said container, where said filter means is designed to trap, between its lower surface and the bottom wall, of said container, filtered-out particulate matter, where said filter means is an open-pore, elastic foam whose circumference is larger than the circumference of said container, where said plunger device's circumference is smaller in diameter than the inside diameter of said container so that, in operation, parts of said foam disk fill the space between the outer circumference of said plunger device and the inner walls of said container during the downward passage of said plunger device, and where, when said plunger means is detached, the compressed, elastic material trying to expand against the walls of said container, holds said filter means in place, operating said plunger device so that said plunger means forces said filter means to the bottom of said beverage container, disengaging said plunger means from said filter means, and removing said plunger means from said container and leaving said filter means in said container trapping, between its lower surface and the bottom of said beverage container, filtered-out spent coffee grounds or tea leaves from the resulting beverage.

* * * * *